United States Patent
Yi

(10) Patent No.: US 6,687,490 B2
(45) Date of Patent: Feb. 3, 2004

(54) TRANSMISSION APPARATUS AND METHOD FOR A MOBILE COMMUNICATION TERMINAL

(75) Inventor: Han-Jun Yi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 474 days.

(21) Appl. No.: 09/750,669

(22) Filed: Dec. 29, 2000

(65) Prior Publication Data

US 2001/0019949 A1 Sep. 6, 2001

(30) Foreign Application Priority Data

Dec. 30, 1999 (KR) ....................................... P1999-66979

(51) Int. Cl.⁷ ................................................. H04B 1/06

(52) U.S. Cl. ............................... 455/232.1; 455/127.2; 455/522; 330/51; 330/127; 330/199

(58) Field of Search ................................. 455/91, 115.1, 455/117, 126, 127.1, 127.2, 232.1, 234.1, 522, 572; 330/51, 123, 127, 129, 199, 200

(56) References Cited

U.S. PATENT DOCUMENTS

| | | | | |
|---|---|---|---|---|
| 5,170,495 A | * | 12/1992 | McNicol et al. | 455/126 |
| 6,215,987 B1 | * | 4/2001 | Fujita | 455/522 |
| 6,553,213 B1 | * | 4/2003 | Kikuchi | 330/129 |

* cited by examiner

Primary Examiner—Quochien Vuong
(74) Attorney, Agent, or Firm—Dilworth & Barrese, LLP

(57) ABSTRACT

A transmission apparatus with reduced current consumption for a mobile terminal is disclosed. The transmission apparatus includes an automatic gain control (AGC) amplifier for AGC-amplifying an input baseband signal; an attenuator for attenuating an output signal of the AGC amplifier; a multiplier for multiplying an output signal of the attenuator by a carrier frequency signal to convert the signal into a radio frequency (RF) signal; a first filter for filtering an output signal of the multiplier; a drive amplifier for amplifying an output signal of the first filter; a second filter for filtering an output signal of the drive amplifier; a power amplifier for amplifying an output signal of the second filter; and an antenna. When output power of the mobile terminal is lower than predetermined maximum output power of the AGC amplifier, the output signal of the AGC amplifier is transmitted through the multiplier, the first filter and the antenna.

16 Claims, 3 Drawing Sheets

TRANSMISSION APPARATUS AND METHOD FOR A MOBILE COMMUNICATION TERMINAL

This application claims priority to an application entitled "Apparatus for Reducing Current Consumption in a Mobile Communication Terminal" filed in the Korean Industrial Property Office on Dec. 30, 1999 and assigned Serial No. 99-66979, the contents of which are hereby incorporated by reference.

BACKGROUND OF THE INVENTION

1. Field of the Invention

The present invention relates generally to a mobile communication terminal, and in particular, to a transmission apparatus and method for reducing current consumption.

2. Description of the Related Art

In a mobile communication terminal (hereinafter, referred to as a "mobile terminal" for short), an RF (Radio Frequency) module is divided into a receiver and a transmitter. The receiver converts a signal received from a base station into a baseband signal and provides the baseband signal to a modem. The transmitter converts a baseband signal from the modem into an RF signal and transmits the RF signal to the base station.

For power control, the transmitter of the mobile terminal controls a gain of a signal output from a baseband analog (BBA) processor using an automatic gain control (AGC) amplifier. For example, an AGC amplifier made by Qualcomm has an operating range of about 85 dB from −45 dB to +40 dB. Since the maximum output power of the AGC amplifier is −14 dB for a gain of about 30 dB (as set forth on the data sheet for a Qualcomm-made AGC amplifier), it can be expected that the output power of the amplifier is about 6 dBm. Further, since output power of the BBA processor is −17 dBm, it is possible to use power of about up to 0 dBm for the output power of the amplifier. However, since there exist gains of a drive amplifier and a power amplifier on an actual transmission line budget, an attenuator (with an attenuation of 25 to 30 dB) is used at an output end of the AGC amplifier to amplify again the signal before transmission, in order to obtain a sufficient operating range. This method is disadvantageous in that the power obtained by using a battery is attenuated and then the attenuated signal is amplified again by using the battery, so that the batter is doubly wasted, causing a reduction in an operating time of the mobile terminal. Here, the dBm stands for the value of absolute power which is generated using log function at the basis of 1 mW.

FIG. 1 shows a transmission apparatus for a conventional mobile terminal, having the above-stated structure.

Referring to FIG. 1, a BBA processor 101 converts a digital signal output from a modem (not shown) into a baseband analog signal. An AGC amplifier 102 controls a gain of a signal output from the BBA processor 101 according to a control voltage provided from the modem. An attenuator 103 attenuates the output signal of the AGC amplifier 102. A mixer 104 mixes a signal output from the attenuator 103 with a frequency generated by a local oscillator (not shown) to convert the input signal into an RF signal. A filter 105 bandpass-filters the output signal of the mixer 104. A drive amplifier 106 amplifies the output signal of the filter 105. A filter 107 bandpass-filters the output signal of the drive amplifier 106. A power amplifier 108 amplifies the output signal of the filter 107 to a transmission power level. A duplexer 109 separates transmission signals from reception signals. That is, the duplexer 109 transmits the output signal of the power amplifier 108 through an antenna ANT and provides a received signal to a receiver (not shown).

The conventional mobile terminal having the above-stated structure controls transmission power in two methods. One is an open loop power control method for the controlling transmission power such that the sum of reception power Rx and transmission power Tx should pursue predetermined level of x dBm. Another is a closed-loop power control method in which the mobile terminal receives power control bits from the base station and controls the transmission power according to the received power control bits.

In the foregoing two power control methods, the modem can control the transmission power by detecting field strength of a signal received from the base station and then applying the detected field strength to the AGC amplifier 102. That is, the AGC amplifier 102 amplifies or attenuates the input signal according to the control voltage to vary the transmission power at the antenna ANT. Here, a variable range of the transmission power at the antenna ANT is referred to as a "dynamic range", and this dynamic range is determined depending on a dynamic range of the AGC amplifier 102.

However, since the transmitter of the conventional mobile terminal attenuates the signal using the attenuator 103 at an output end of the AGC amplifier 102 and then amplifies the attenuated signal contrarily at the following stages of the drive amplifier 106 and the power amplifier 108, an efficiency of the battery is inevitably decreased. In addition, the transmitter has an inefficient structure that the efficiency of the AGC amplifier 102 cannot be sufficiently utilized and instead, gains of the drive amplifier and the power amplifier are used, because of excessive attenuation by the AGC amplifier 102.

SUMMARY OF THE INVENTION

It is, therefore, an object of the present invention to provide an apparatus and method for transmitting an output signal of an AGC amplifier directly through an antenna without using a drive amplifier and a power amplifier, when output power of a mobile terminal is lower than the maximum output power of the AGC amplifier in a transmitter.

To achieve the above and other objects, there is provided a transmission apparatus for a mobile terminal. The transmission apparatus includes an automatic gain control (AGC) amplifier for AGC-amplifying an input baseband signal; an attenuator for attenuating an output signal of the AGC amplifier; a multiplier for multiplying an output signal of the attenuator by a carrier frequency signal to convert the signal into a radio frequency (RF) signal; a first filter for filtering an output signal of the multiplier; a drive amplifier for amplifying an output signal of the first filter; a second filter for filtering an output signal of the drive amplifier; a power amplifier for amplifying an output signal of the second filter; and an antenna. When output power of the mobile terminal is lower than predetermined maximum output power of the AGC amplifier, the output signal of the AGC amplifier is transmitted through the multiplier, the first filter and the antenna.

Preferably, the output power of the mobile terminal is determined depending on field strength of a signal received from a base station.

Preferably, the output power of the mobile terminal is determined depending on power control bits received from a base station.

Preferably, when the output power of the mobile terminal is lower than the predetermined maximum output power of the AGC amplifier, a power supply voltage provided to the drive amplifier and the power amplifier is blocked.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In an exemplary embodiment of the present invention, when output power of the mobile terminal is lower than the maximum output power of an AGC amplifier, the mobile terminal directly provides the output signal of the AGC amplifier to a duplexer without using a drive amplifier and a power amplifier, thereby to decrease current consumption. Otherwise, when the output power of the mobile terminal exceeds the maximum output power of the AGC amplifier, the mobile terminal transmits the signal in the existing method. That is, when communication can be performed at low transmission power because of, for example, short distances between the base station and the mobile terminal, or good channel conditions, the mobile terminal transmits the transmission signal by using only the AGC amplifier without using the drive amplifier and the power amplifier, thereby to reduce current consumption. To this end, the mobile terminal according to the present invention includes switches for switching the two signal paths and a switching control signal Vsw_on for controlling the switches. It is preferable that the switching control signal should be generated at the point where the output power of the mobile terminal becomes equal to the maximum output power of the AGC amplifier.

Figure 1:
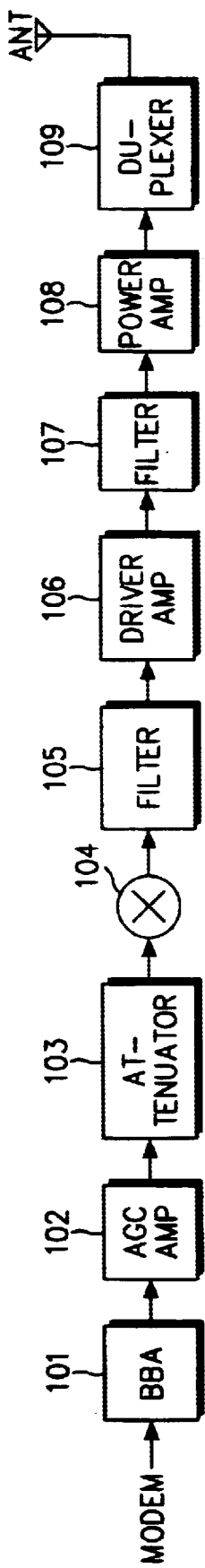
FIG. 1 is a block diagram illustrating a transmission apparatus for a conventional mobile terminal.
Figure 2:
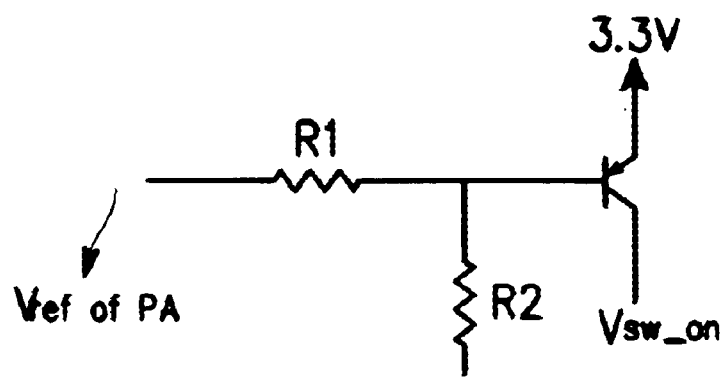
FIG. 2 is a diagram illustrating a circuit for generating a switching control signal Vsw_on in a mobile terminal according to an embodiment of the present invention.

FIG. 2 shows a circuit for generating the switching control signal Vsw_on according to an embodiment of the present invention.

Figure 3:
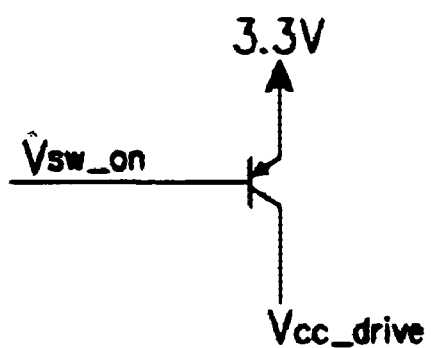
FIG. 3 is a diagram illustrating a switching circuit for blocking a power supply voltage provided to amplifiers in the mobile terminal according to an embodiment of the present invention.

Referring to FIG. 2, an input signal is utilized as a control voltage (Vref) of a power amplifier (PA), which determines an amplifying value of the PA with reference to PDM signals outputted from MODEM according to communication environment between a base station and a mobile station. The control voltage Vref is divided by resistors R1 and R2. Here, the resistors R1 and R2 serve to turn OFF a transistor at a voltage where the output power of the mobile terminal becomes equal to the maximum output power of the AGC amplifier. Herein, in case the transistor is turned ON by switching control voltage (Vref) of the power amplifier (PA) 108 being decreased below a predetermined value due to the close distance between the base station and the mobile station or improvement of the communication environment, the switching control signal Vsw_on is turned ON (or activated). Otherwise, the switching control signal Vsw_on is turned OFF (or inactivated). When the switching control signal Vsw_on is in the OFF state, the power supply voltage Vcc_drive is provided to the drive amplifier and the power amplifier as shown in FIG. 3, and then, the transmission signal is transmitted in the existing method. However, when the switching control signal Vsw_on is in the ON state, the power supply voltage Vcc_drive is not provided to the drive amplifier 106 and the power amplifier 108, and then, the output signal of the AGC amplifier 102 is directly provided to the mixer 104 without passing through the attenuator 103. Subsequently, for suppression of the low frequency band signal, the output of the mixer is filtered and then directly delivered to the antenna through a second switch 112. Here, it is expected to reduce current consumption by blocking the power supply voltage being provided to the drive amplifier 106 and the power amplifier 108.

FIG. 3 shows a switching circuit for blocking the power supply voltage provided to the drive amplifier and the power amplifier according to an embodiment of the present invention.

Referring to FIG. 3, the switching circuit receives the switching control signal Vsw_on generated by the circuit of FIG. 2. When the switching control signal Vsw_on is in the OFF state, the power supply voltage Vcc_drive is provided to the drive amplifier and the power amplifier, and when the switching control signal Vsw_on is in the ON state, the power supply voltage Vcc_drive provided to the drive amplifier and the power amplifier is blocked. Here, it is preferable to use an FET (Field Effect Transistor) as a switch for the power amplifier, since a large current flows through the switch. The switching circuit of FIG. 3 is included in a drive amplifier 106 and a power amplifier 108 of FIG. 4 which will be described below, to selectively provide/block the power supply voltage to the drive amplifier 106 and the power amplifier 108.

Figure 4:
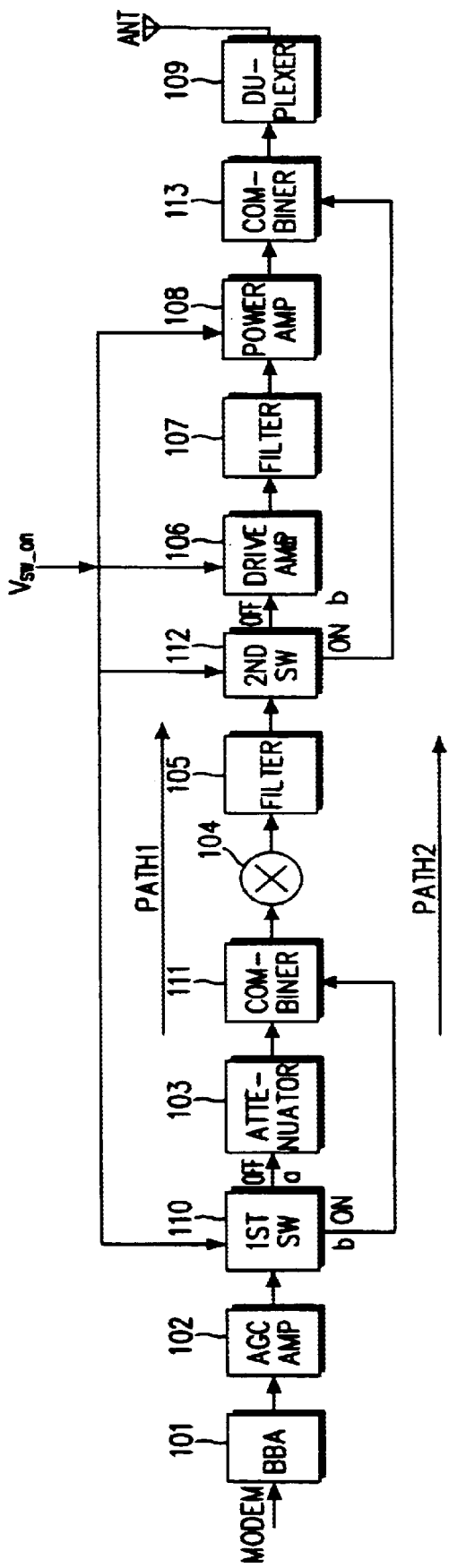
FIG. 4 is a block diagram illustrating a transmission apparatus for a mobile terminal according to an embodiment of the present invention.

FIG. 4 shows a transmission apparatus for a mobile terminal according to an embodiment of the present invention.

Referring to FIG. 4, a BBA processor 101 converts a digital signal output from a modem (not shown) into a baseband analog signal. An AGC amplifier 102 controls a gain of the signal output from the BBA processor 101 according to a control voltage provided from the modem. A first switch 110 is switched according to the switching control signal Vsw_on generated by the circuit of FIG. 2. When the switching control signal Vsw_on is in the OFF state, the first switch 110 is switched to a node "a" so that the output signal of the AGC amplifier 102 is provided to an attenuator 103. Otherwise, when the switching control signal Vsw_on is in the ON state, the first switch 110 is switched to a node "b" so that the output signal of the AGC amplifier 102 is directly provided to a combiner 111 without passing through the attenuator 103.

The attenuator 103 attenuates the output signal of the AGC amplifier 102. The combiner 111 receives one of the outputs transmitted selectively from the attenuator 103 and the first switch 110 and output the signal. Here, if the output power of the mobile terminal is higher than the maximum output power of the AGC amplifier 102, the output signal of the AGC amplifier 102 is applied to the combiner 111 through the attenuator 103. Otherwise, if the output power of the mobile terminal is lower than the maximum output power of the AGC amplifier 102, the output signal of the first switch 110 is directly applied to the combiner 111. A mixer 104 mixes the output signal of the attenuator 103 with a carrier frequency generated by a local oscillator (not shown) to convert the signal into an RF signal. A filter 105 bandpass-filters the output signal of the mixer 104.

A second switch 112 is also switched according to the switching control signal Vsw_on. When the switching control signal Vsw_on is in the OFF state, the second switch 112 is switched to a node "a" so that the output signal of the filter 105 is provided to a drive amplifier 106. Otherwise, if the switching control signal Vsw_on is in the ON state, the second switch 112 is switched to a node "b" so that the output signal of the filter 105 is directly provided to a combiner 113 without passing through a drive amplifier 106 and a power amplifier 108 of the following stage.

The drive amplifier 106 amplifies the output signal of the filter 105, provided through the second switch 112. Here, the drive amplifier 106 is enabled (or driven) in response to the switching control signal Vsw_on. For example, in the case where the switching control signal Vsw_on is in the OFF state because the output power of the mobile terminal is higher than the maximum output power of the AGC amplifier 102, the power supply voltage Vcc_drive is provided to the drive amplifier 106 by the circuit of FIG. 3. On the contrary, if the switching control signal Vsw_on is in the ON state, the power supply voltage Vcc_drive provided to the drive amplifier 106 is blocked.

The filter 107 bandpass-filters the output signal of the drive amplifier 106. The power amplifier 108 amplifies the output signal of the filter 107 to a transmission power level. The power amplifier 108 is also enabled in response to the switching control signal Vsw_on. For example, when the switching control signal Vsw_on is in the OFF state because the output power of the mobile terminal is higher than the maximum output power of the AGC amplifier 102, the power supply voltage Vcc_drive is provided to the power amplifier 108 by the circuit of FIG. 3. Otherwise, if the switching control signal Vsw_on is in the ON state, the power supply voltage Vcc_drive provided to the power amplifier 108 is blocked.

The combiner 113 receives one of the outputs transmitted selectively from the power amplifier 108 and the second switch 112 and output the signal. If the output power of the mobile terminal is higher than the maximum output power of the AGC amplifier 102, the output signal of the filter 105 is applied to the combiner 113 through the drive amplifier 106 and the power amplifier 108. Otherwise, if the output power of the mobile terminal is lower than the maximum output power of the AGC amplifier 102, the output signal of the filter 105 is directly switched to the combiner 113 from the second switch 112. A duplexer 109 separates transmission signals from reception signals. That is, the duplexer 109 transmits the output signal of the power amplifier 108 through an antenna ANT and provides a received signal through the antenna to a receiver (not shown).

Now, operation of the transmission apparatus according to the present invention will be described with reference to FIGS. 2 to 4. For convenience of explanation, the term "normal path" (or a first path) as used herein refers to a signal path in which the first and second switches 110 and 112 are turned OFF so that the transmission signal of the mobile terminal is output through the drive amplifier 106 and the power amplifier 108. Further, the term "saved path" (or a second path) refers to a signal path in which the first and second switches 110 and 112 are turned ON so that the transmission signal of the mobile terminal is transmitted without passing through the drive amplifier 106 and the power amplifier 108. As mentioned in the description of the prior art, the output power of the mobile terminal is determined by measuring field strength of a signal received from the base station or determined depending on the power control bits received from the base station. Further, the maximum output power of the AGC amplifier is previously determined in the design process according to the characteristics of the elements.

First, when the output power of the mobile terminal (which refers to the output power of the power amplifier 108) is lower than the maximum output power of the AGC amplifier 102 due to the close distance between the base station and the mobile station or improvement of the communication environment, the switching control signal Vsw_on is turned ON by the circuit of FIG. 2 by the Vref of PA being decreased below the predetermined value. Here, the switching control signal Vsw_on in the ON state is provided in common to the first switch 110, the second switch 112, the drive amplifier 106 and the power amplifier 108. As the switching control signal Vsw_on is turned ON, the first and second switches 110 and 112 are both switched to their node "b", so that the output signal of the BBA processor 101 is delivered to the duplexer 109 through the saved path which excludes the attenuator 103, the drive amplifier 106 and the power amplifier 108. At this moment, the power supply voltage Vcc_drive provided to the drive amplifier 106 and the power amplifier 108 is blocked by the circuit of FIG. 3, thereby reducing the current consumption.

Otherwise, if the output power of the mobile terminal is higher than the maximum output power of the AGC amplifier 102 due to the far distance between the base station and the mobile station or aggravation of the communication environment, the switching control signal Vsw_on is turned OFF by the circuit of FIG. 2 by the Vref of PA being increased over the predetermined value. The switching control signal Vsw_on in the OFF state is provided in common to the first switch 110, the second switch 112, the drive amplifier 106 and the power amplifier 108. As the switching control signal Vsw_on is turned OFF, the first and second switches 110 and 112 are both switched to their node "a", so that the output signal of the BBA processor 101 is delivered to the duplexer 109 through the normal path as in the existing method. At this moment, the power supply voltage Vcc_drive is normally provided to the drive amplifier 106 and the power amplifier 108 by the circuit of FIG. 3.

Conventionally, in the mobile communication system which performs power control, if the mobile terminal needs to output low power, the AGC amplifier first attenuates the transmission signal and then the amplifiers in the following stage amplify the attenuated transmission signal contrarily. However, in the embodiment of the present invention, when the mobile terminal needs to output the transmission signal at lower transmission power, the AGC amplifier amplifies the transmission signal and then directly provides the amplified signal to the duplexer, thereby making it possible to prevent the amplifiers in the following stage from consuming the current unnecessarily. In addition, by doing so, it is possible to reduce the dynamic range of the AGC amplifier, facilitating designing of an AGC amplifier with reduced current consumption.

As described above, the present invention can reduce the current consumption by avoiding use of the drive amplifier and the power amplifier when the output power of the mobile terminal is lower than the maximum output power (e.g., 2 dBm for Qualcornm-made AGC amplifiers) of the AGC amplifier. In general, when the output power of the mobile terminal is 0dBm, the drive amplifier consumes a current of 25–30 mA and the power amplifier consumes a current of 30–40 mA. Therefore, when these amplifiers are not driven (or disabled), it is possible to reduce current consumption by about 55–70 mA, which corresponds to about ⅔the total current consumed by the transmitter excluding the BBA processor. Since the typical reception power of the mobile terminal is −85 to −65 dBm in crowded downtowns or places with heavy pedestrian traffic, the typical output power of the mobile terminal is −10 to +10dBm. Therefore, by using the novel power saving structure, it is possible to remarkably increase the operating time of mobile terminals with limited battery capacity.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A transmission apparatus for a mobile terminal, comprising:
   an automatic gain control (AGC) amplifier for AGC-amplifying an input baseband signal;
   an attenuator for attenuating an output signal of the AGC amplifier;
   a multiplier for multiplying an output signal of the attenuator by a carrier frequency signal to convert the signal into a radio frequency (RF) signal;
   a first filter for filtering an output signal of the multiplier;
   a drive amplifier for amplifying an output signal of the first filter;
   a second filter for filtering an output signal of the drive amplifier;
   a power amplifier for amplifying an output signal of the second filter; and
   an antenna;
   wherein when output power of the mobile terminal is lower than a predetermined maximum output power of the AGC amplifier, the output signal of the AGC amplifier is transmitted through the multiplier, the first filter and the antenna, without being transmitted through the attenuator, the drive amplifier, the second filter and the power amplifier.

2. The transmission apparatus as claimed in claim 1, wherein the output power of the mobile terminal is determined depending on field strength of a signal received from a base station.

3. The transmission apparatus as claimed in claim 1, wherein the output power of the mobile terminal is determined depending on power control bits received from a base station.

4. The transmission apparatus as claimed in claim 1, wherein when the output power of the mobile terminal is lower than the predetermined maximum output power of the AGC amplifier, a power supply voltage provided to the drive amplifier and the power amplifier is blocked.

5. A transmission apparatus for a mobile terminal, comprising:
   an AGC amplifier for AGC-amplifying an input baseband signal;
   a frequency conversion part for converting an output signal of the AGC amplifier to an RF signal;
   an amplifying part for power-amplifying an output signal of the frequency conversion part; and
   an antenna;
   wherein output power of the mobile terminal is lower than a predetermined maximum output power of the AGC amplifier, the output signal of the frequency conversion part is directly transmitted through the antenna, without being transmitted through the amplifying part.

6. The transmission apparatus, as claimed in claim 5, wherein the output power of the mobile terminal is determined depending on field strength of a signal received from a base station.

7. The transmission apparatus as claimed in claim 5, wherein the output power of the mobile terminal is determined depending on power control bits received from a base station.

8. The transmission apparatus as claimed in claim 5, wherein the amplifying part comprises:
   a drive amplifier for amplifying an output signal of the frequency conversion part;
   a filter for bandpass-filtering an output signal of the drive amplifier; and
   a power amplifier for power-amplifying an output signal of the filter.

9. The transmission apparatus as claimed in claim 8, wherein when the output power of the mobile terminal is lower than the predetermined maximum output power of the AGC amplifier, a power supply voltage provided to the drive amplifier and the power amplifier is blocked.

10. A transmission method for a mobile terminal including an AGC amplifier for AGC-amplifying an input baseband signal, a frequency conversion part for converting an output signal of the AGC amplifier to an RF signal, an amplifying part for power-amplifying an output signal of the frequency conversion part, and an antenna, the method comprising the steps of:
    detecting field strength of a signal received from a base station;
    determining output power of the mobile terminal according to the detected field strength of the received signal;
    directly transmitting an output signal of the frequency conversion part through the antenna, when the determined output power of the mobile terminal is lower than predetermined maximum output power of the AGC amplifier, without transmitting through the amplifying part.

11. The transmission method as claimed in claim 10, further comprising the step of blocking a power supplying voltage provided to the amplifying part, when the output power of the mobile terminal is lower than the predetermined maximum output power of the AGC amplifier.

12. A transmission method for a mobile terminal including an AGC amplifier for AGC-amplifying an input baseband signal, an attenuator for attenuating an output signal of the AGC amplifier, a multiplier for multiplying an output signal of the attenuator by a carrier frequency signal to convert the signal into an RF signal, a first filter for filtering an output signal of the multiplier, a drive amplifier for amplifying an output signal of the first filter, a second filter for filtering an output signal of the drive amplifier, a power amplifier for amplifying an output signal of the second filter, and an antenna, the method comprising the steps of:
    determining output power of the mobile terminal; and
    transmitting the output signal of the AGC amplifier through the multiplier, the first filter and the antenna, when output power of the mobile terminal is lower than predetermined maximum output power of the AGC amplifier, without transmitting through the attenuator, the drive amplifier, the second filter and the power amplifier.

13. The transmission apparatus as claimed in claim 12, wherein the output power of the mobile terminal is determined depending on field strength of a signal received from a base station.

14. The transmission apparatus as claimed in claim 12, wherein the output power of the mobile terminal is determined depending on power control bits received from a base station.

15. The transmission method as claimed in claim 12, further comprising the step of blocking a power supply voltage provided to the drive amplifier and the power amplifier, when the output power of the mobile terminal is lower than the predetermined maximum output power of the AGC amplifier.

16. A transmitting method of a mobile terminal including an AGC amplifier, an attenuator, a drive amplifier, a power amplifier and an antenna, said method comprising the step of blocking power supply voltage which is provided to the drive amplifier and the power amplifier and transmitting output signal of the AGC amplifier through the antenna without transmitting through the attenuator, the drive amplifier and the power amplifier when output power of the mobile terminal is lower than the maximum output power of the AGC amplifier predetermined.

* * * * *